(12) United States Patent
Kim et al.

(10) Patent No.: US 8,238,054 B2
(45) Date of Patent: Aug. 7, 2012

(54) HARD DISK DRIVE HAVING DESICCANT MEMBER

(75) Inventors: Tae Young Kim, Yongin-si (KR); Chang-Hwan Lee, Seoul (KR)

(73) Assignee: Seagate Technology International, Scotts Valley, CA (US)

( * ) Notice: Subject to any disclaimer, the term of this patent is extended or adjusted under 35 U.S.C. 154(b) by 148 days.

(21) Appl. No.: 12/783,682

(22) Filed: May 20, 2010

(65) Prior Publication Data

US 2010/0296191 A1    Nov. 25, 2010

(51) Int. Cl.
*G11B 33/14*    (2006.01)

(52) U.S. Cl. .................................................. 360/97.12

(58) Field of Classification Search ....................... None
See application file for complete search history.

(56) References Cited

U.S. PATENT DOCUMENTS

| 7,333,283 B2 * | 2/2008 | Akamatsu et al. | 360/69 |
| 2006/0066974 A1 * | 3/2006 | Akamatsu et al. | 360/69 |

FOREIGN PATENT DOCUMENTS

| JP | 02001004 A * | 1/1990 |
| JP | 05-012848 | 1/1993 |
| JP | 10-326476 | 12/1998 |
| JP | 2006-216157 | 8/2006 |
| KR | 1997-12678 | 3/1997 |

* cited by examiner

*Primary Examiner* — David D Davis

(57) ABSTRACT

A hard disk drive effectively removes internal humidity therefrom and thus improves the reliance and performance of the hard disk drive in high and increased humidity environments.

19 Claims, 14 Drawing Sheets

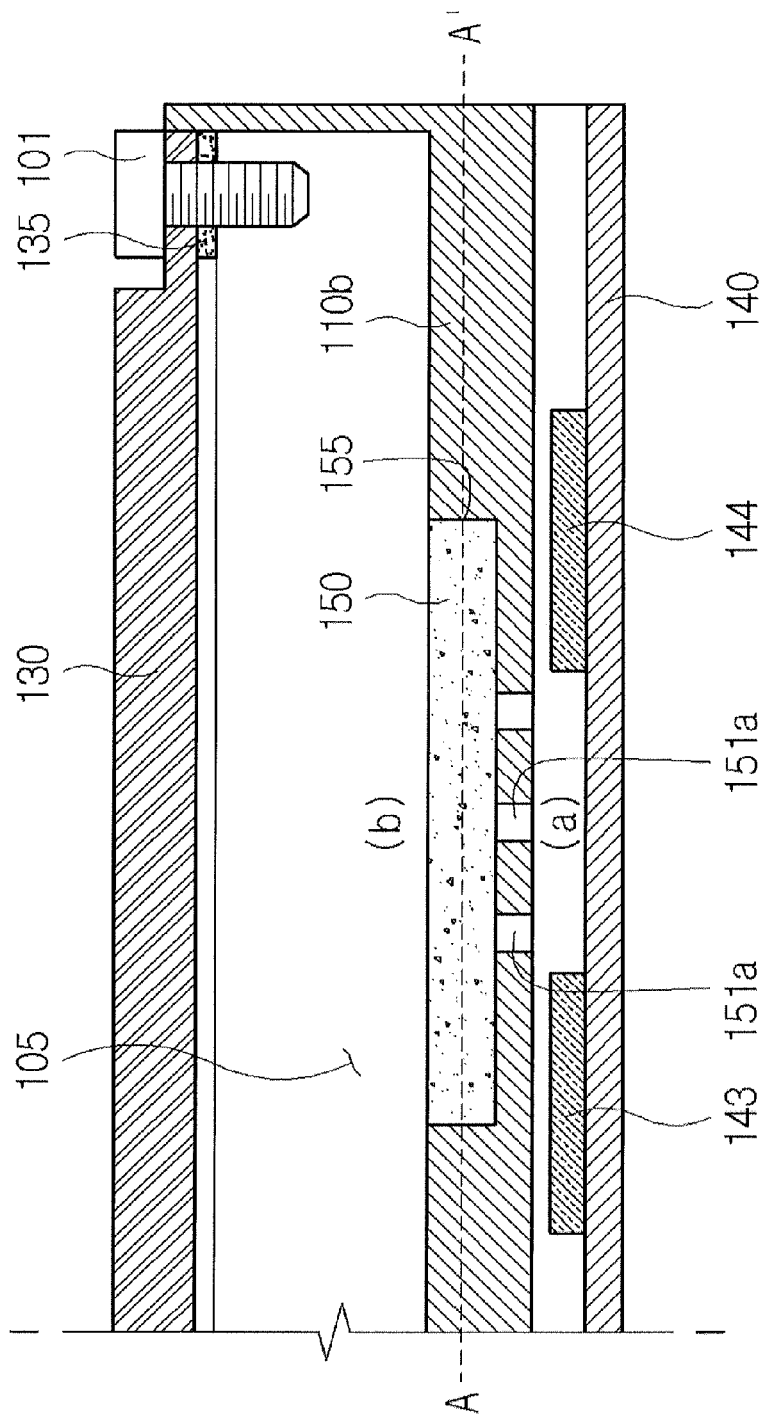

HARD DISK DRIVE HAVING DESICCANT MEMBER

CROSS-REFERENCE TO RELATED APPLICATIONS

This application claims priority under 35 U.S.C. §119 from Korean Patent Application No. 10-2009-0044283, filed on May 21, 2009, in the Korean Intellectual Property Office, the disclosure of which is incorporated herein by reference.

BACKGROUND

1. Field of the General Inventive Concept

The general inventive concept relates to an auxiliary memory unit of a computer system, and more particularly, to a hard disk drive which can effectively remove internal humidity and thus improve reliance and performance in humid environments.

2. Description of the Related Art

A hard disk drive (HDD) has been widely used as an auxiliary memory unit of a computer system or the like.

The hard disk drive includes a desiccant member as a means for keeping internal humidity constant.

Such a desiccant member absorbs humidity when humidity in the hard disk drive becomes higher, and keeps the humidity in the hard disk drive low.

However, once the humidity in the hard disk drive is too high and saturates the desiccant member with humidity, the desiccant member only serves as a source of supplying humidity to the inside of the hard disk drive rather than performs its original function, thereby lowering the reliance and the performance of the hard disk drive in increased or high humidity environments. Accordingly, there is need of preparing a countermeasure to this.

SUMMARY

The general inventive concept provides a hard disk drive which can effectively remove internal humidity and thus improve reliance and performance in humid environments.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a hard disk drive including a base internally provided with a plurality of internal parts related to reading and writing information, a printed circuit board assembly (PCBA) mounted with a plurality of parts on a surface thereof and coupled to one side of the base, a desiccant through hole penetrating the base along a thickness direction of the base and disposed adjacent to a heat generating source that generates heat when operating among the plurality of parts mounted to the PCBA, and a desiccant member provided on the base in a region of the desiccant through hole and absorbing and discharging internal humidity of the base to an outside via the desiccant through hole.

The heat generating source may include at least one controller chip mounted to the surface of the PCBA and performing control related to reading and writing the information.

The heat generating source may include at least one memory chip mounted to the surface of the PCBA and storing data and a table.

The PCBA may be coupled to a rear side of the base, and the desiccant through hole may be disposed between the controller chip and the memory chip.

The hard disk drive may further include a desiccant member seating part on a bottom portion of the base, where the desiccant member is at least partially accommodated and coupled.

The hard disk drive may further include a fitting projection which protrudes from a bottom surface inside the base and to which the desiccant member is fitted.

The fitting projection may include a straight type or a hook type an end of which is bent.

The PCBA may be coupled to a rear surface of the base and the heat generating source may be mounted to a rear surface of the PCBA, and the PCBA may further include a hole that communicates with the desiccant through hole.

The desiccant through hole may be plurally provided to correspond to one of the desiccant member.

At least one set of the desiccant through hole and the desiccant member may be provided in every region of a heat generating source on the PCBA.

The desiccant member may contact the desiccant through hole.

The desiccant member may be coupled to the base by an adhesive resin.

A first region disposed between the PCBA and the base member may have a high temperature and a second region disposed above the base member may have a lower temperature than the temperature of the first region.

The foregoing and/or other aspects and utilities of the present general inventive concept may also be achieved by providing a hard disk drive including a printed circuit board assembly (PCBA) having a plurality of active and passive components including at least one controller and at least one memory device thereon, a base member including a plurality of disks and a head stack assembly connected to the PCBA by a flexible printed circuit board, a cover coupled to a top of the base to form an internal space within the base member, a gasket interposed between the cover and the base to keep airtightness between the cover and the base, a desiccant member formed in a bottom portion of the base member to absorb humidity within the internal space, and at least one through hole positioned below the desiccant member to output humidity absorbed by the desiccant member.

The humidity may be output external to the hard drive.

The at least one of the controller and memory device may heat the desiccant member through the through hole to create a temperature grade within the desiccant member.

The heat from the controller or memory device may prevent the desiccant member from being fully saturated.

The hard disk drive may further include a plurality of through holes positioned adjacent each of the controller and memory device.

The hard disk drive may further include a desiccant liner disposed within the at least one through hole.

BRIEF DESCRIPTION OF THE DRAWINGS

Exemplary embodiments of the general inventive concept will be more clearly understood from the following detailed description taken in conjunction with the accompanying drawings in which:

The above and/or other aspects and utilities of the present general inventive concept will become apparent and more readily appreciated from the following description of the exemplary embodiments, taken in conjunction with the accompanying drawings, in which:

FIG. 10 is a partial schematic cross-section view illustrating a hard disk drive according to another exemplary embodiment of the present general inventive concept;

DETAILED DESCRIPTION OF THE EMBODIMENTS

Figure 1:
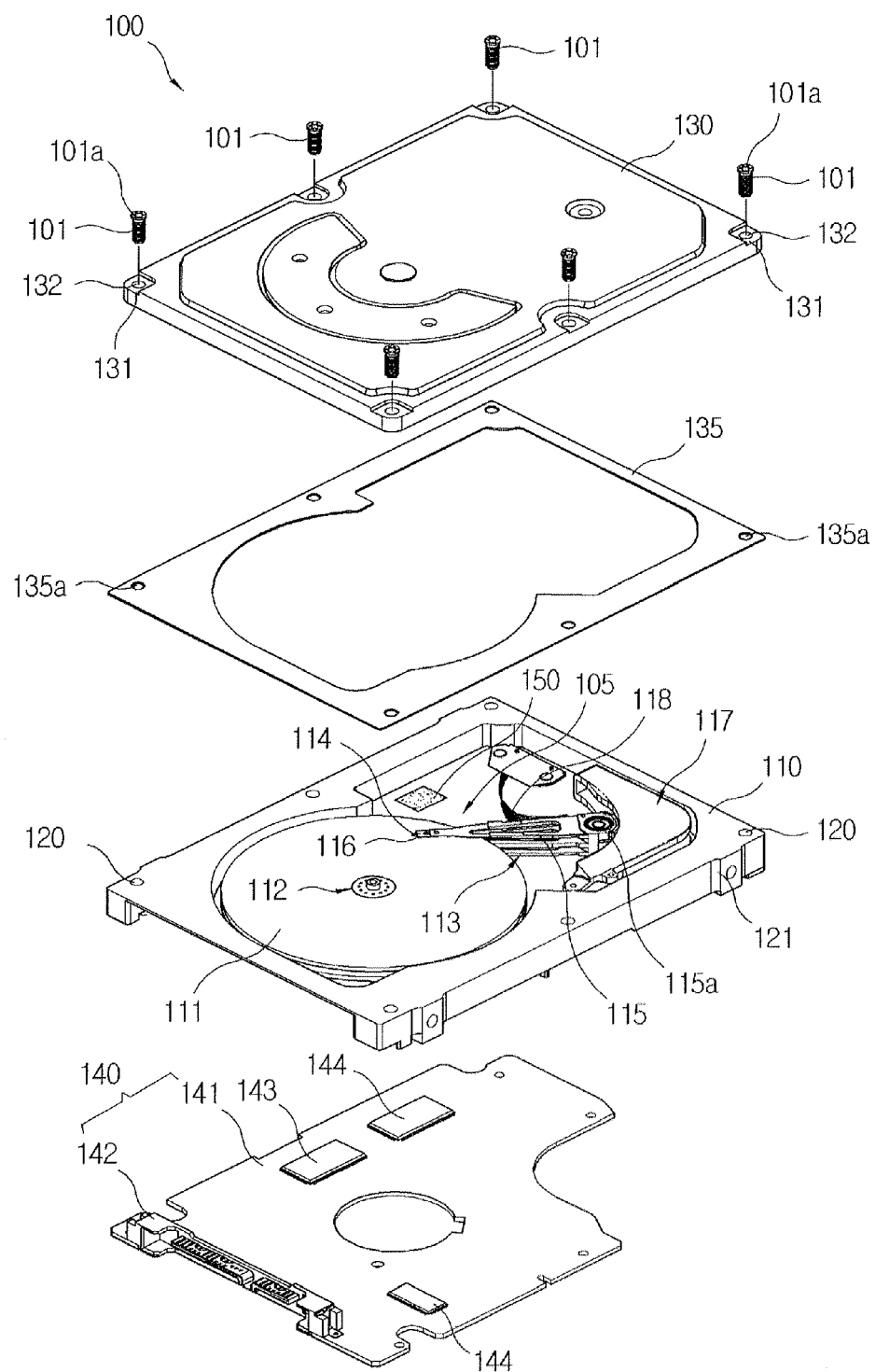
FIG. 1 is an exploded perspective view illustrating a hard disk drive according to an exemplary embodiment of the present general inventive concept.

The attached drawings to illustrate embodiments of the general inventive concept are referred to in order to gain a sufficient understanding of the general inventive concept and the merits thereof.

Hereinafter, the general inventive concept will be described in detail by explaining embodiments of the general inventive concept with reference to the attached drawings. Like reference numerals in the drawings denote like elements. Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
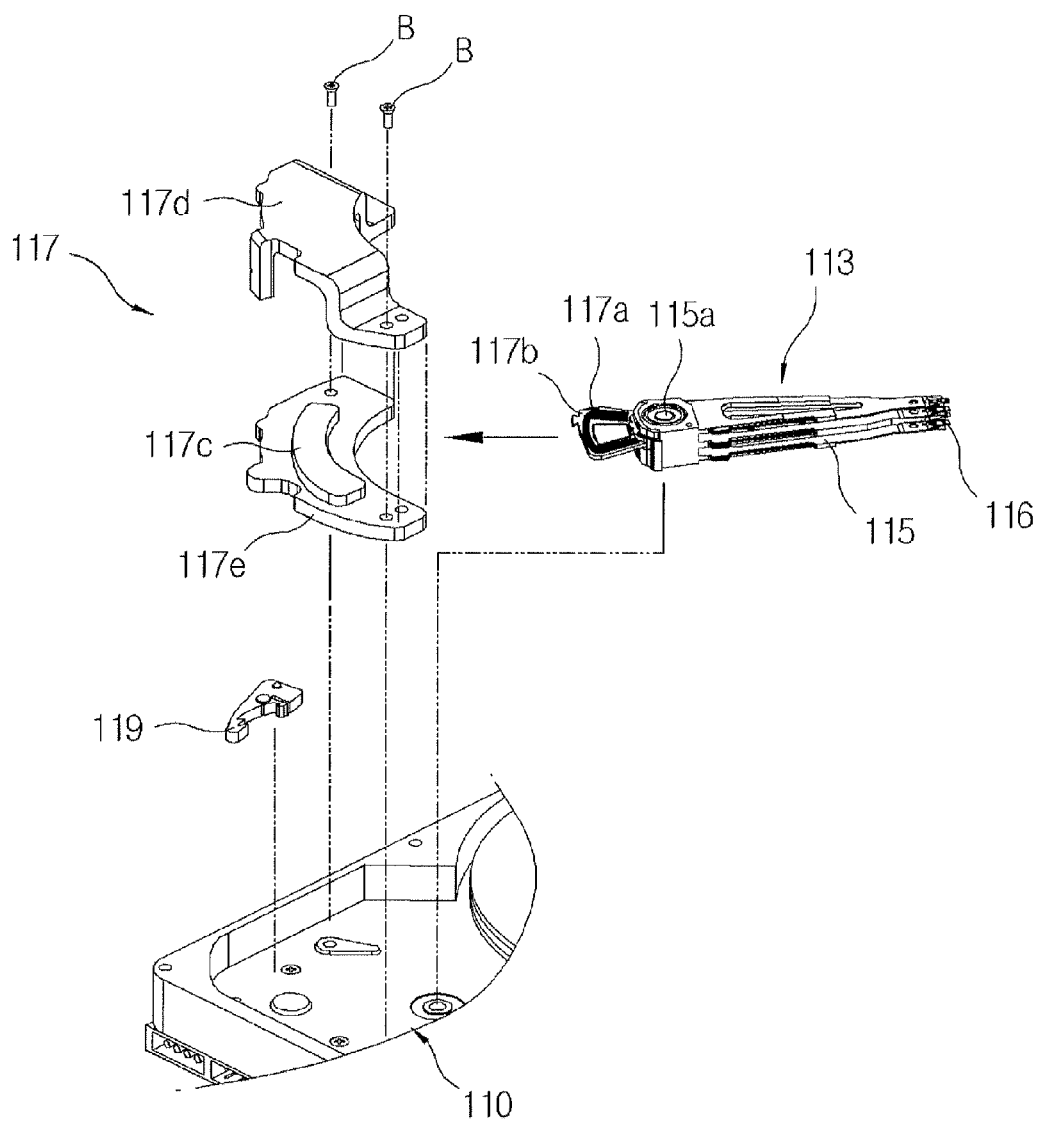
FIG. 2 is a partial exploded perspective view in a region of a head stack assembly (HSA) and a voice coil motor (VCM) of the present general inventive concept.
Figure 3:
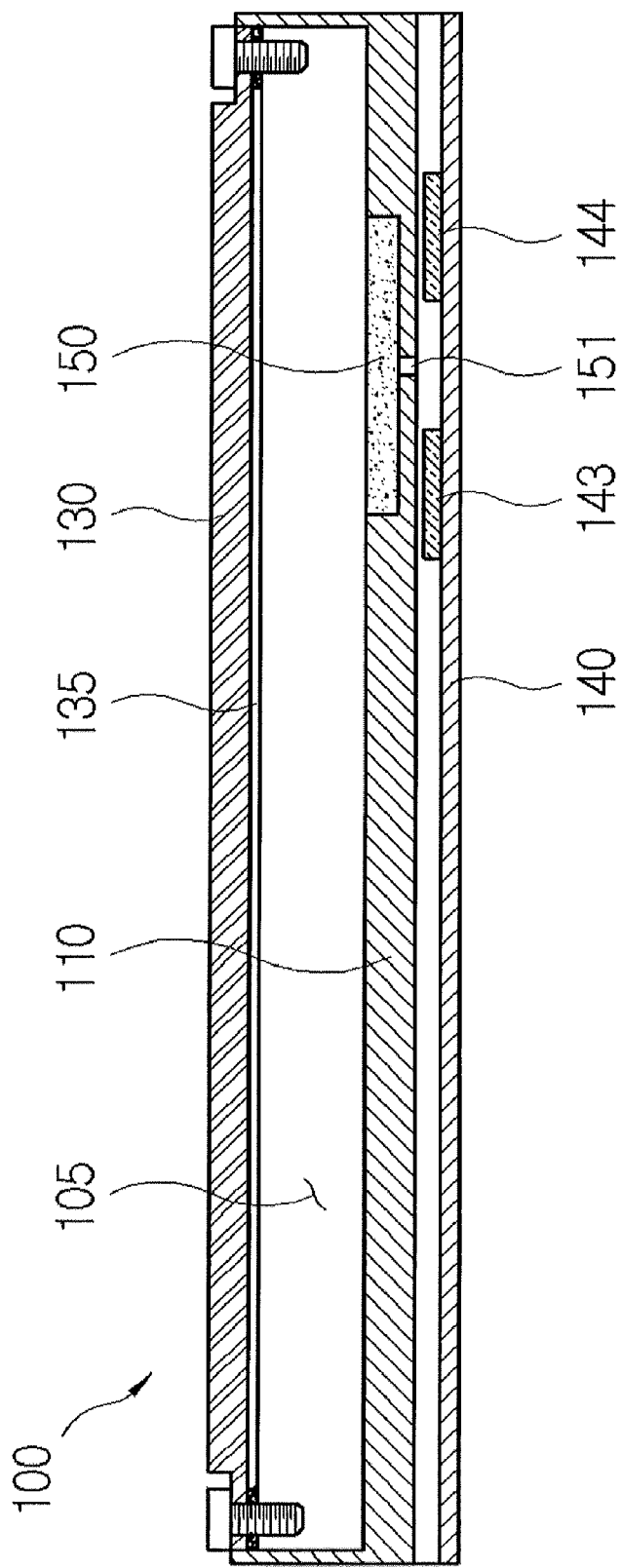
FIG. 3 is a schematic cross-section view illustrating an assembled state of FIG. 1.
Figure 4:
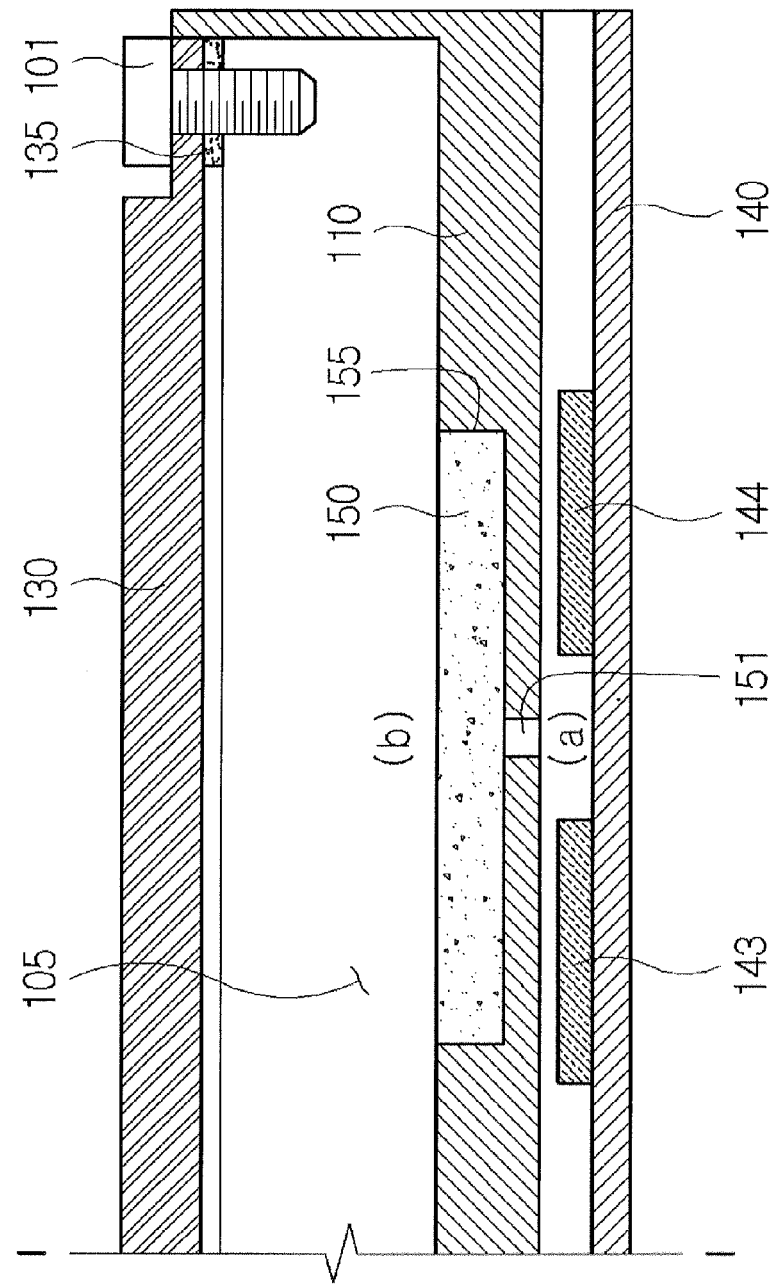
FIG. 4 is a partial enlarged view of FIG. 3.

FIG. 1 is an exploded perspective view illustrating a hard disk drive according to an exemplary embodiment of the present general inventive concept, FIG. 2 is a partial exploded perspective view in a region of a head stack assembly (HSA) and a voice coil motor (VCM), FIG. 3 is a schematic cross-section view illustrating an assembled state of FIG. 1, and FIG. 4 is a partial enlarged view of FIG. 3.

As illustrated, a hard disk drive 100 according to an exemplary embodiment of the present general inventive concept includes a base 110 provided with a plurality of internal parts (not illustrated) related to reading and writing information, a cover 130 coupled to a top of the base 110 and forming an internal space 105 (see FIG. 3) together with the base 110, a gasket 135 interposed between the cover 130 and the base 110 to keep airtightness between the cover 130 and the base 110, and a printed circuit board assembly (PCBA) 140 coupled to a bottom of the base 110.

The base 110 is mounted with the plurality of internal parts (not illustrated) related to reading and writing information. Included in the base 110 are at least one disk 111 to record and store data, a spindle motor 112 provided in a center region of the disk 111 and rotating the disk 111, a head stack assembly (HSA) 113 relatively rotating toward the disk 111, and so on are mounted to the base 110.

The base 110 is classified into a flat type base manufactured to have a flat top surface on which the internal parts are put, and a bowl type base where the internal parts are accommodated and coupled.

In this exemplary embodiment, the bowl type base 110 may be used, but not limited thereto. Alternatively, the present general inventive concept may be applied to the flat type base (not illustrated).

Prior to description of the internal parts in the base 110, the cover 130 will be described. The cover 130 covers the top surface of the base 110 to protect the plurality of internal parts.

The cover 130 may be made of a metallic material. Particularly, the cover 130 may be manufactured by die-casting aluminum (Al) alloy or pressing steel.

The cover 130 is coupled to the base 110 by a plurality of screws 101, e.g., six screws 101 in this exemplary embodiment. The cover 130 is formed with a recessed part 131 where a head 101a of the screw 101 is placed.

Further, the gasket 135 is provided between the cover 130 and the base 110 as a means to airtightly seal a coupling surface between the cover 130 and the base 110 when the cover 130 is coupled to the base 110. The gasket 135 may be made of rubber, and may form a closed loop continuing along a circumference on the top surface of the base 130 while not interfering with the internal parts.

The gasket 135 and the cover 130 may be sequentially disposed on the top surface of the base 110, and the screws 101 may be fastened to screw grooves 120 of the base 110 via holes 132 of the cover 130 and holes 135a of the gasket 135, thereby assembling the hard disk drive 110.

The base 110 may further include protruding portions 121 used when mounting the hard disk drive 100 into a personal or other computer assembly. The protruding portions allow the hard disk drive 100 to be firmly fitted into a computer assembly to provide a stable foundation for the parts within the hard disk drive 100 to operate correctly.

The PCBA 140 is coupled to the bottom of the base 110. The PCBA 140 may include a printed circuit board (PCB) 141 embedded with a plurality of passive and active circuit parts, connecting lines, and a connector 142 coupled to one side of the PCB 141.

Although not illustrated in FIG. 1, the plurality of parts are mounted onto the PCB 141. Among these parts, there can be at least one controller chip 143 that serves to perform control related to reading and writing information, and at least one memory chip 144 that may store data and a table. As opposed to other parts, the controller chip 143 and the memory chip 144 generate heat when the hard disk drive 100 operates. In practice, the controller chip 143 may reach a temperature of several tens into the hundreds of degrees in different portions of the drive when the hard disk drive 100 is in operation.

As mentioned above, the HSA 113 rotates toward the disk 111 and allows a magnetic head 114 to write data or read the data on the disk 111. At this time, the data is transmitted to the PCBA 140 coupled to the bottom of the base 110 through a flexible printed circuit (FPC) 118.

Among the internal parts provided in the base 110, the HSA 113 includes the magnetic head 114 to write data or to read data on the disk 111, and an actuator 115 to fly the magnetic head 114 to access data on the disk 111.

The magnetic head 114 may be installed at a front end of a head gimbal 116 extended from and connected to the actuator 115 and may move up by air current on the surface of the disk 111 as the plurality of disks 111 rotates at high speed, thereby flying while maintaining a minute space from the surface of the disk 111. The HSA 113 may be provided with a plurality of actuator arms and plurality of magnetic heads 114 to read and write data to and from a plurality of disks 111.

The actuator 115 is coupled to a pivot shaft 115a provided in the base 110 and rotates relative to the disk 111 with respect to the pivot shaft 115a. In other words, a voice coil motor (VCM) 117 may be installed at one end of the actuator 115 and drives the actuator 115 to move left and right, so that the magnetic head 114 provided in one end of the actuator 115 can write data on a track of the disk 111 or read the data from the track while moving in a radial direction on the disk 111.

The VCM 117 will be schematically described with reference to FIG. 2. The VCM 117 may include a voice coil 117a to form one side of the HSA 113 that is rotatable with respect to the pivot shaft 115a (as illustrated in FIG. 1). The voice coil 117a may be wound on a bobbin 117b. A pair of magnets 117c may be disposed having opposite magnetic poles in upper and lower regions of the bobbin 117b with the bobbin 117b therebetween. The pair of magnets 117c may generate a magnetic field interacting with an electric field of the voice coil 117a. The VCM may also include a motor casing 117d, 117e to which the pair of magnets 117c may be coupled.

The motor casing 117d, 117e may be divided into upper and lower motor casings 117d and 117e according to their relative positions, respectively. The respective upper and lower motor casings 117d and 117e may be coupled to the base 110 by bolts B after interposing the bobbin 117b therebetween.

Under the lower motor casing 117e, a latch 119 may be provided to elastically support the actuator 115 so that the actuator 115 can be prevented from freely moving when the magnetic head 114 is parked on a parking zone (not illustrated) of the disk 111. If a ramp is separately provided in the parking zone as a support even though it is not illustrated, the magnetic head 114 may be parked on the ramp. In this case, the parking zone is excluded from the disk 111.

As described above, the hard disk drive 100 may include a desiccant member 150 (see FIG. 1) to keep internal humidity constant, i.e., to remove or absorb the internal humidity.

The desiccant member 150 serves to keep the internal humidity of the hard disk drive 100 low by absorbing and removing humidity when the internal humidity of the hard disk drive 100 is increased.

If the desiccant member 150 is placed at a position improper to perform its original function of lowering humidity in the hard disk drive 100 or a structure around the desiccant member 150 is abnormal, the improper positioning or obstructions of desiccant member 150 may cause the reliance and performance of the hard disk drive 100 to be lower in high humidity situations.

In this regard, if the internal humidity of the hard disk drive 100 becomes saturated under increased humidity, the desiccant member 150 may also become saturated. In this case, the desiccant member 150 has to discharge the humidity to the outside of the hard disk drive 100. However, when the desiccant member 150 becomes saturated, the saturated desiccant member 150 may serve as a source of supplying humidity to the inner space 105 of the hard disk drive 100, and thus deteriorate the reliance and performance of the hard disk drive 100 under the increased humidity conditions.

In the state that the internal humidity of the hard disk drive 100 is saturated under increased humidity and thus the desiccant member 150 also becomes saturated, a case where the desiccant member 150 is left as is and a case where the desiccant member is removed were compared. In a result, the inside of the hard disk drive 100 is more quickly recovered to have low humidity when the desiccant member 150 is removed after it became saturated. Thus, having a desiccant member that becomes saturated can be detrimental to a hard disk drive.

Such an experiment directly shows that the desiccant member 150 in conventional arrangements may cause the reliance and performance of the hard disk drive 100 to be lower in humid situations if the desiccant member 150 is placed at a position improper to perform its desired function or a structure around the desiccant member 150 is abnormal.

To solve this conventional problem, the present exemplary embodiment improves the position of the desiccant member 150 or the ambient structure of the desiccant member 150 as follows.

In an exemplary embodiment, the desiccant member 150 may be provided on a bottom wall portion of the base 110 as illustrated in FIGS. 1, 3 and 4. One reason why the desiccant member 150 is placed on the bottom portion of the base 110 is because the PCBA 140 is generally mounted to the bottom of the base 110.

To install the desiccant member 150, the bottom portion of the base 110 may further include a desiccant member seating part 155 that may include a groove or indentation in the bottom portion of the base 110 of the hard disk drive 100. If the desiccant member seating part 155 is formed as illustrated in FIGS. 3 and 4, the desiccant member 150 can be accommodated in and coupled to the desiccant member seating part 155. The desiccant member 150 may be coupled to the desiccant member seating part 155 through an adhesive such as an epoxy resin or other adhesive material.

On the bottom portion of the base 110, where the desiccant member 150 is positioned, is formed a desiccant through hole 151 penetrating through the base 110 along a thickness direction thereof. The desiccant through hole 151 may be formed to be near a heat generating source, which generates heat while operating, among the plurality of parts mounted to the PCBA 140.

In other words, as described above, the controller chip 143 and the memory chip 144 among the plurality of parts mounted to the PCBA 140 are heat generating sources which generate heat when the hard disk drive 100 operates, as opposed to other parts of the PCBA 140 that may not generate significant heat. The desiccant through hole 151 may be formed to be adjacent to either or both of the heat generating sources such as the controller chip 143 and the memory chip 144, and the desiccant member 150 may be placed in a region of the desiccant through hole 151.

Thus, in this exemplary embodiment, the desiccant through hole 151 formed in the bottom portion of the base 110 may be disposed between the heat generating sources such as the controller chip 143 and the memory chip 144, and the desiccant member 150 may be placed in the region of the desiccant through hole 151. Accordingly, referring to FIG. 4, a region designated as (a) may have a high temperature due to the heat generating sources, and a region (b) may have a relatively lower temperature than the region (a).

Consequently, in light of the presence of the desiccant member 150 and heat sources 143, 144, the desiccant member 150 may be kept at a high temperature at the bottom thereof facing the heat generating sources, but a low temperature at the top thereof facing the inner space 105.

Thus, a temperature grade may be formed in the desiccant member 150 to vary the temperature within the desiccant member, so that the humidity absorbed in the desiccant member 150 can be readily discharged to the outside of the hard disk drive 100 via the desiccant through hole 151 and through the PCB 140. Even though the internal humidity of the hard disk drive 100 may become saturated as described above, because of the temperature grade of the desiccant member 150, the desiccant member will not become saturated and be able to keep the internal structure of the hard disk drive 100 to a humidity value less than full saturation.

That the humidity is discharged to the outside of the hard disk drive 100 via the desiccant through hole 151 also means that a lower side of the desiccant member 150 adjacent to the heat generating source such as the controller chip 143 and the memory chip 144 may be dried in sequence.

Through this process, if the humidity is effectively removed from the inner space 105 of the hard disk drive 100, the internal humidity of the hard disk drive 100 may be lowered to an original no or low humidity state and improve the reliance and performance of the hard disk drive 100 in high or increased humidity environments and situations.

With this configuration, operation of the hard disk drive 100 is as follows.

If power is supplied to the hard disk drive 100 and an electric current is thus applied to the voice coil 117*a* of the VCM 117, the actuator 115 rotates with respect to the pivot shaft 115*a*. Thus, the magnetic head 114 flies up and moves relative to the surface of the rotating disk 111, thereby writing and reading data on the disk 111.

If such an operation of the hard disk drive 100 is performed under increased humidity, the internal humidity of the hard disk drive 100 may reach a humidity saturation point and therefore the desiccant member 150 may also reach a saturated state.

However, since the desiccant through hole 151 is disposed between the heat generating sources such as the controller chip 143 and the memory chip 144 and the desiccant member 150 is positioned in a region of the desiccant through hole 151 (refer to FIG. 4), the desiccant member 150 may be kept to have a high temperature at the bottom thereof facing the heat generating source, but a low temperature at the top thereof facing the inner space 105. The controller chip 143 and the memory chip 144 may warm the desiccant member 150 to keep the desiccant member dry or partially dry and able to continually absorb humidity and moisture from the inner space 105.

In this manner, a temperature grade may be formed in the desiccant member 150, so that the humidity of the desiccant member 150 can be readily discharged to the outside of the hard disk drive 100 via the desiccant through hole 151.

Therefore, humidity is effectively removed from the inner space 105 of the hard disk drive 100, and the internal humidity of the hard disk drive 100 is lowered, thereby eliminating deterioration in the reliance and performance of the hard disk drive 100 in humid situations.

If the power is not supplied to the hard disk drive 100 and thus the disk 111 stops rotating, the magnetic head 114 is parked on the parking zone or parked on the ramp (not illustrated).

According to an exemplary embodiment of the present general inventive concept, the internal humidity of the hard disk drive 100 can be effectively removed to improve the reliance and performance thereof under high or increased humidity conditions.

The structure according to this example embodiment can be advantageous to prevent the inside of the hard disk drive 100 from falling and failing under increased humidity since the desiccant through hole 151 is formed and the desiccant member 150 is disposed adjacent to the heat generating chips 143 and 144 without changing the existing design, i.e., the structure and design of the PCBA 140.

However, if difficulty arises forming the desiccant through hole 151 and disposing the desiccant member 150 at a position adjacent to the heat generating chips 143 and 144 due to interference with the internal parts in the existing structure of the PCBA 140, the structure of the PCBA 140 may be changed to rearrange the heat generating chips 143 and 144 on the PCBA 140 to be near the desiccant through hole 151.

Also, the desiccant member 150 and the desiccant through hole 151 may be positioned other places within the base 110 when component parts of the PCBA 140 have predetermined positional requirements, based on a design of a hard disk drive. The heat generating chips 143 and 144 may be positioned separate from each other and one or a plurality of desiccant members 150 and desiccant member through holes 151 may be positioned adjacent the heat generating chips 143 and 144 to absorb and remove humidity and moisture from the internal space 105 of the base 110 of the hard disk drive 100.

Figure 5:
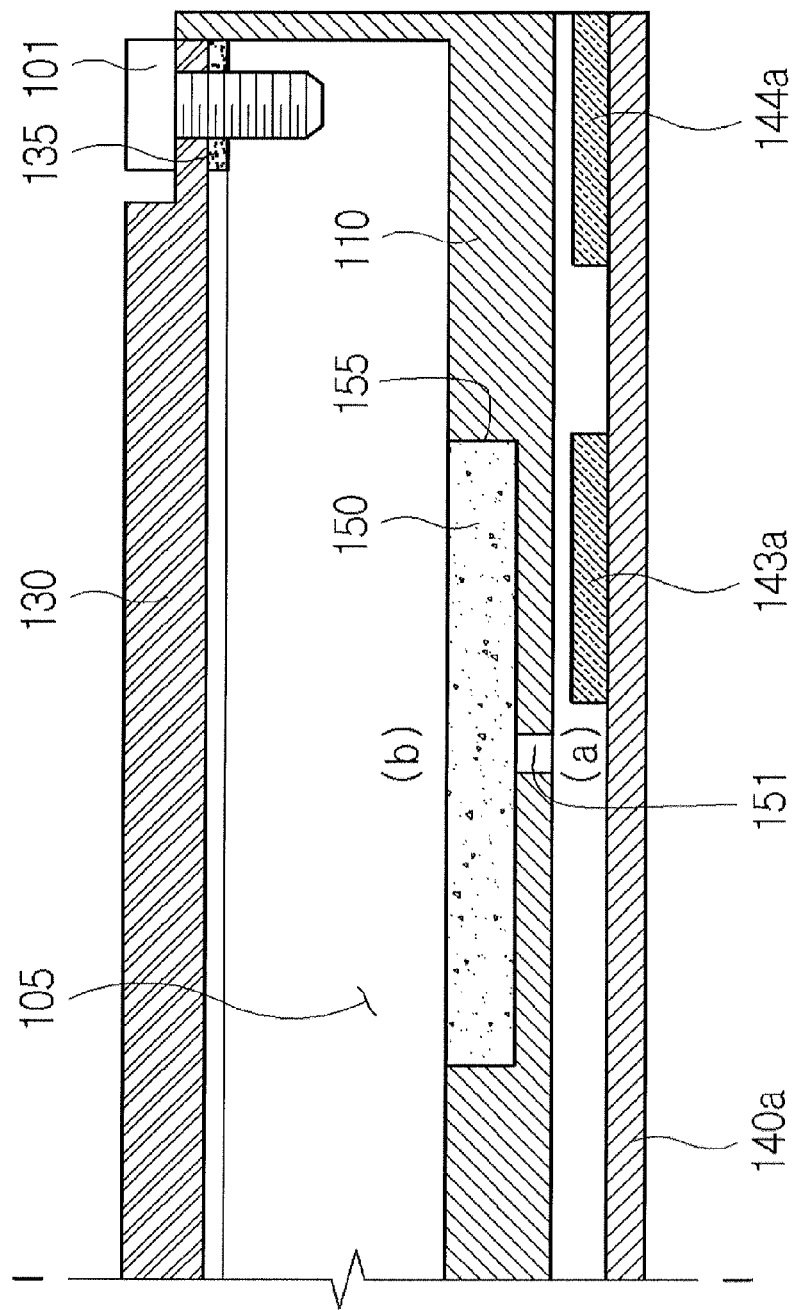
FIG. 5 is a partial schematic cross-section view illustrating a hard disk drive according to another exemplary embodiment of the present general inventive concept.

FIG. 5 is a partial schematic cross-section view illustrating a hard disk drive according to another exemplary embodiment of the present general inventive concept.

As illustrated in FIG. 5, the desiccant through hole 151 in this exemplary embodiment is placed not between the controller chip 143*a* and the memory chip 144*a* as the heat generating sources on the PCBA 140*a* but to one side of the controller chip 143*a*, and the desiccant member 150 is provided in the base 110 around the desiccant through hole 151.

Since the controller chip 143*a* may generate more heat than the memory chip 144*a*, the effect of the present general inventive concept can be achieved when the desiccant through hole 151 and the desiccant member 150 are arranged as illustrated in FIG. 5.

Figure 6:
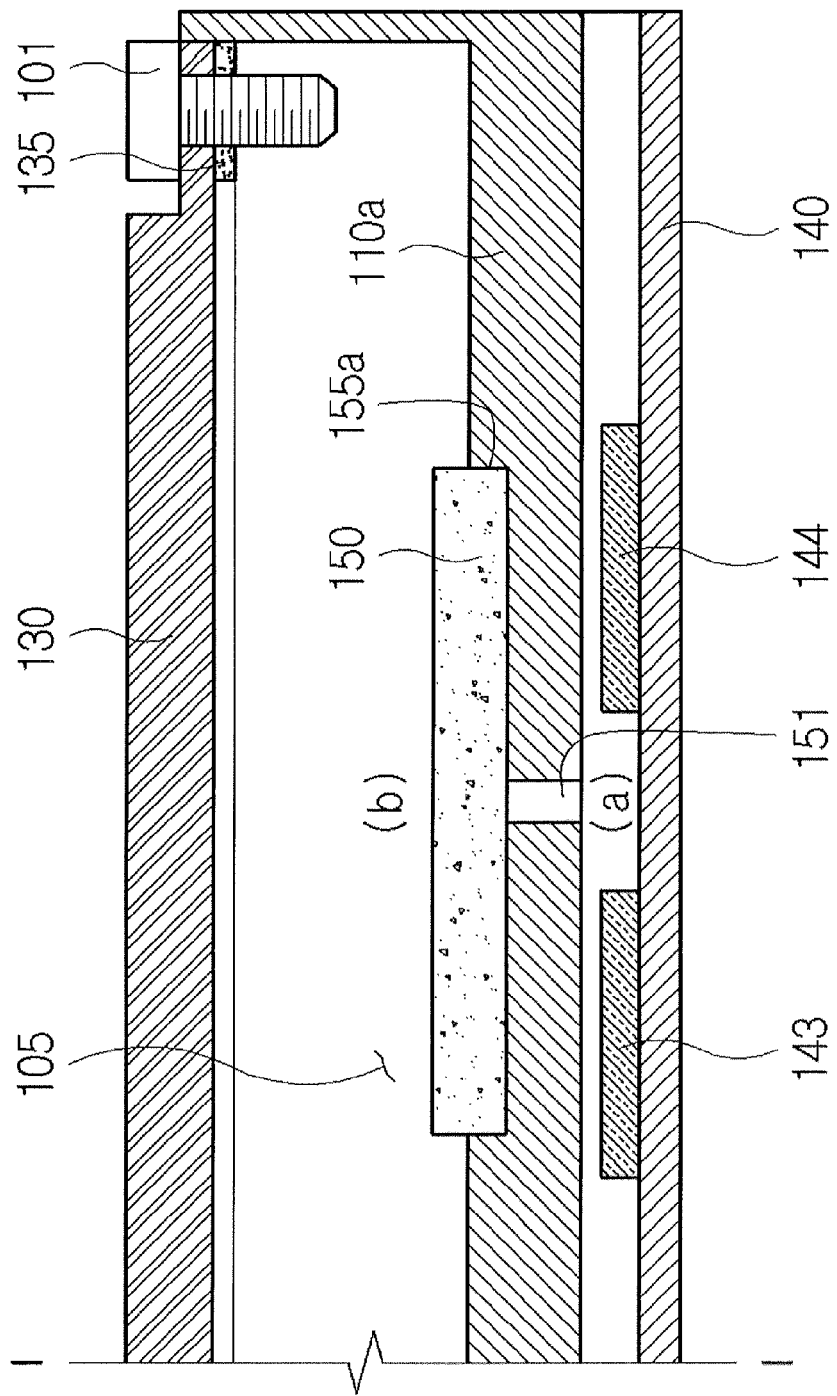
FIG. 6 is a partial schematic cross-section view illustrating a hard disk drive according to another exemplary embodiment of the present general inventive concept.

FIG. 6 is a partial schematic cross-section view illustrating a hard disk drive according to another exemplary embodiment of the present general inventive concept.

In the foregoing example embodiments, the thickness of the desiccant member 150 may be substantially equal to the depth of the desiccant member seating part 155 (refer to FIGS. 4 and 5). Thus, the desiccant member 150 may be fully accommodated in and coupled to the desiccant member seating part 155 under the internal space 105.

However, if the depth of the desiccant member seating part 155 is smaller than the thickness of the desiccant member 150, the desiccant member 150 may upwardly protrude from a bottom surface inside a base 110*a* having a smaller depth desiccant member seating part 155 into the opening 105 as illustrated in FIG. 6. The present general inventive concept can be applied with this form.

Figure 7:
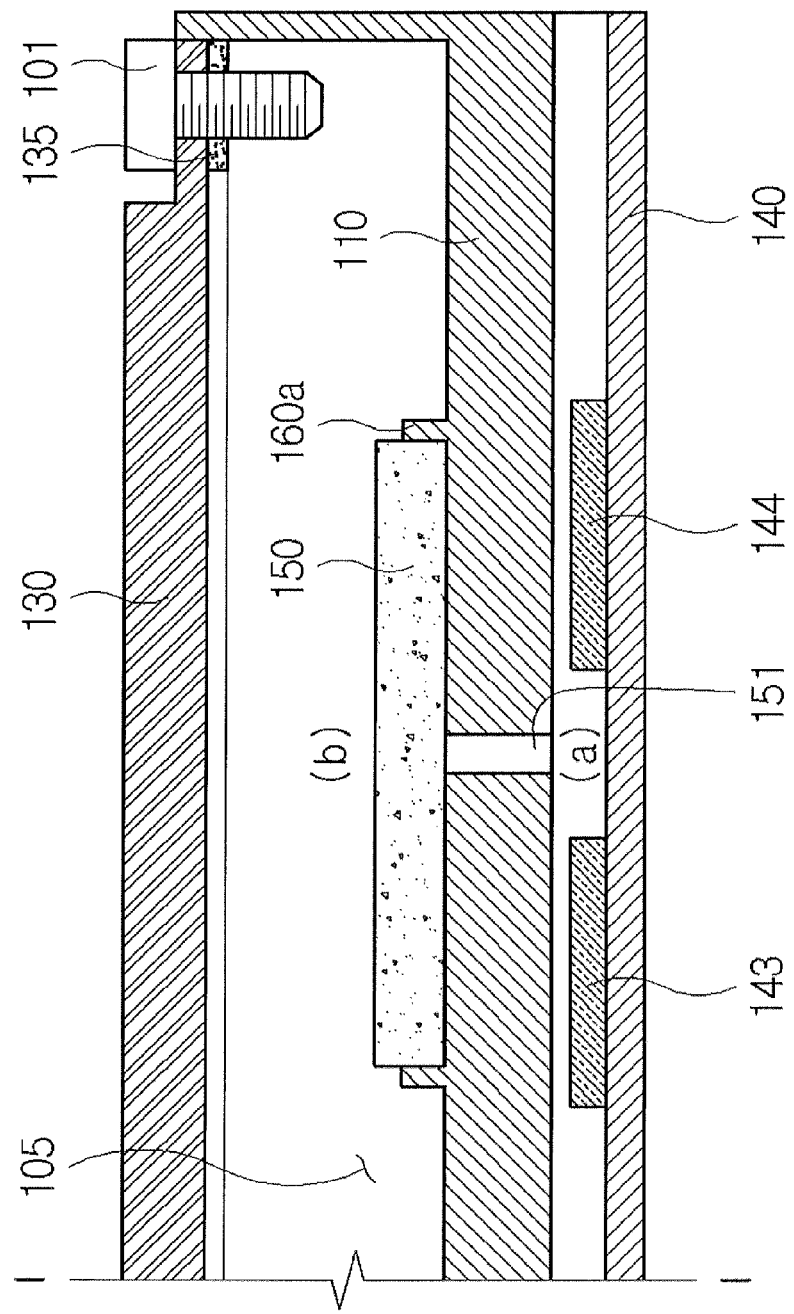
FIG. 7 is a partial schematic cross-section view illustrating a hard disk drive according to another exemplary embodiment of the present general inventive concept.
Figure 8:
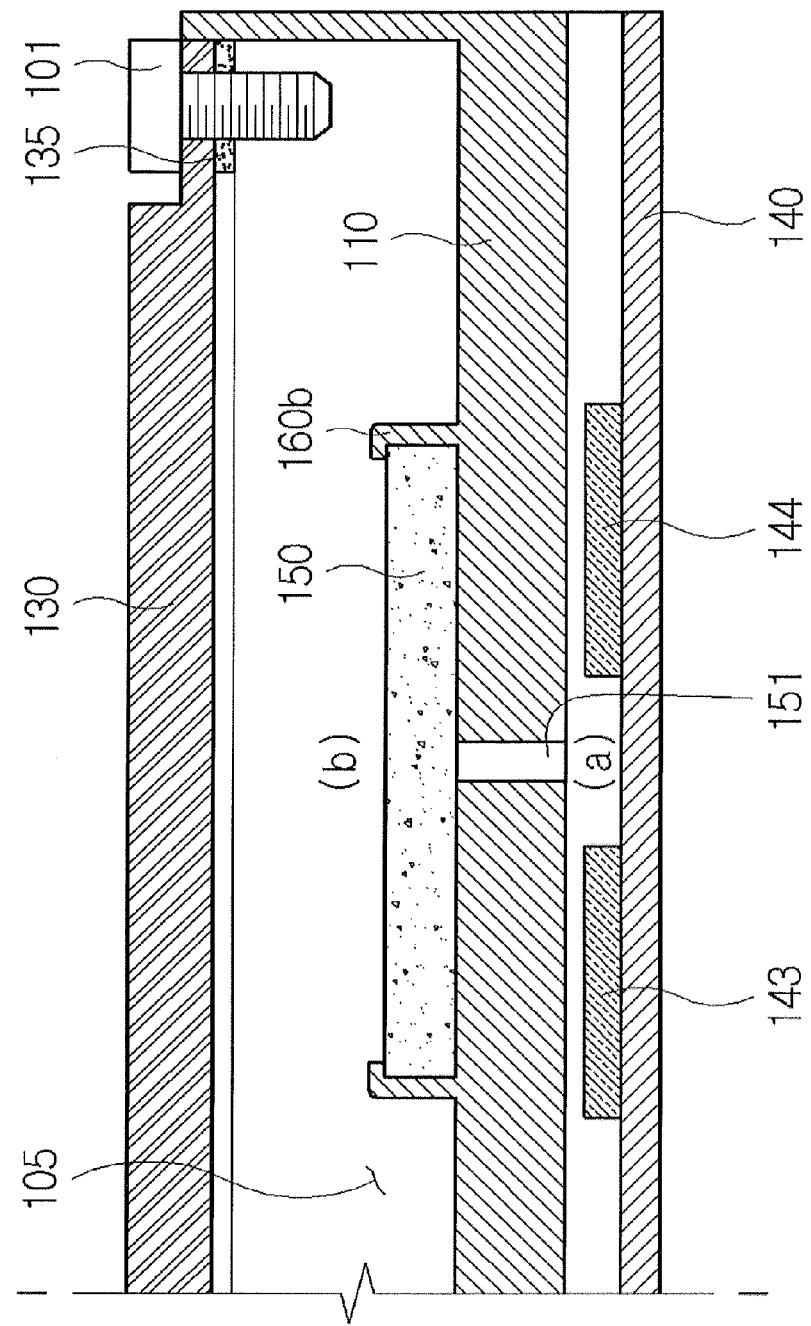
FIG. 8 is a partial schematic cross-section view illustrating a hard disk drive according to another exemplary embodiment of the present general inventive concept.

FIG. 7 is a partial schematic cross-section view illustrating a hard disk drive according to another exemplary embodiment of the present general inventive concept, and FIG. 8 is a partial schematic cross-section view illustrating a hard disk drive according to another exemplary embodiment of the present general inventive concept.

Referring to FIGS. 7 and 8, as opposed to the foregoing embodiments, the desiccant member 150 according to these exemplary embodiments may be provided in the form of being fitted to separate fitting projections 160*a* and 160*b*.

The fitting projections 160*a* and 160*b* protrude from the bottom surface inside the base 110 upward. In the case of FIG.

7, the fitting projections 160a are provided as a straight type. In the case of FIG. 8, the fitting projections 160b are provided as a hook type an end of which is bent.

For reference, the projections illustrated in FIG. 8 may be preferable to prevent the desiccant member 150 from separating from the base 110. However, the type of FIG. 7 may be also prevent the desiccant member 150 from easy separating if the desiccant member 150 is firmly fitted to the straight-type fitting projections 160a.

Figure 9:
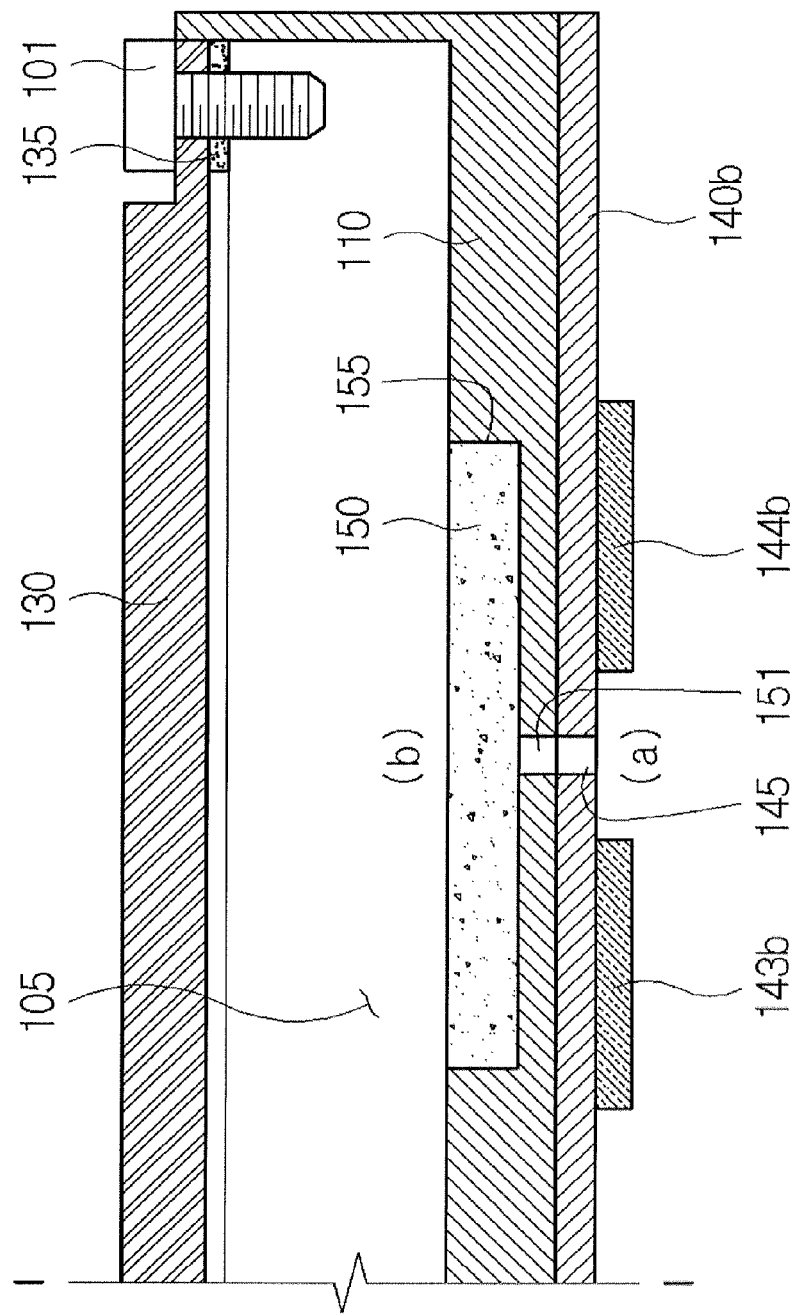
FIG. 9 is a partial schematic cross-section view illustrating a hard disk drive according to another exemplary embodiment of the present general inventive concept.

FIG. 9 is a partial schematic cross-section view illustrating a hard disk drive according to another exemplary embodiment of the present general inventive concept.

In the foregoing embodiments, the controller chip 143, 143a and the memory chip 144, 144a are provided as the heat generating source between the base 100, 100a and the PCBA 140, 140a. However, in this exemplary embodiment, the controller chip 143b and the memory chip 144b are provided on a rear surface of the PCBA 140b.

Even in this case, the effect of the present general inventive concept can be achieved when the desiccant through hole 151 and the desiccant member 150 are placed between the controller chip 143b and the memory chip 144b or adjacent to the controller chip 143b and the memory chip 144b. In this embodiment, the PCBA 140b may further include a hole 145 communicating with the desiccant through hole 151 through the PCBA 140b so as to have an effect of removing humidity from the inner space 105.

FIG. 10 is a partial schematic cross-section view illustrating a hard disk drive according to another exemplary embodiment of the present general inventive concept.

As illustrated therein, a base 110b may include a plurality of desiccant through holes 151a with respect to a single desiccant member 150. The desiccant through holes 151a may be disposed adjacent to the heat generating chips 143 and 144 of the PCBA 140 when a plurality of desiccant through holes 151a are formed. The structure of FIG. 10 can also achieve the effect of the present general inventive concept.

The numbers of the desiccant through holes 151a and the desiccant members are not limited to one in the hard disk drive in the present general inventive concept, as illustrated in FIG. 10 that includes a plurality of desiccant through holes 151a. A plurality of desiccant through holes and desiccant members may be provided to correspond to respective heat generating regions of the PCBA.

Figure 11A:
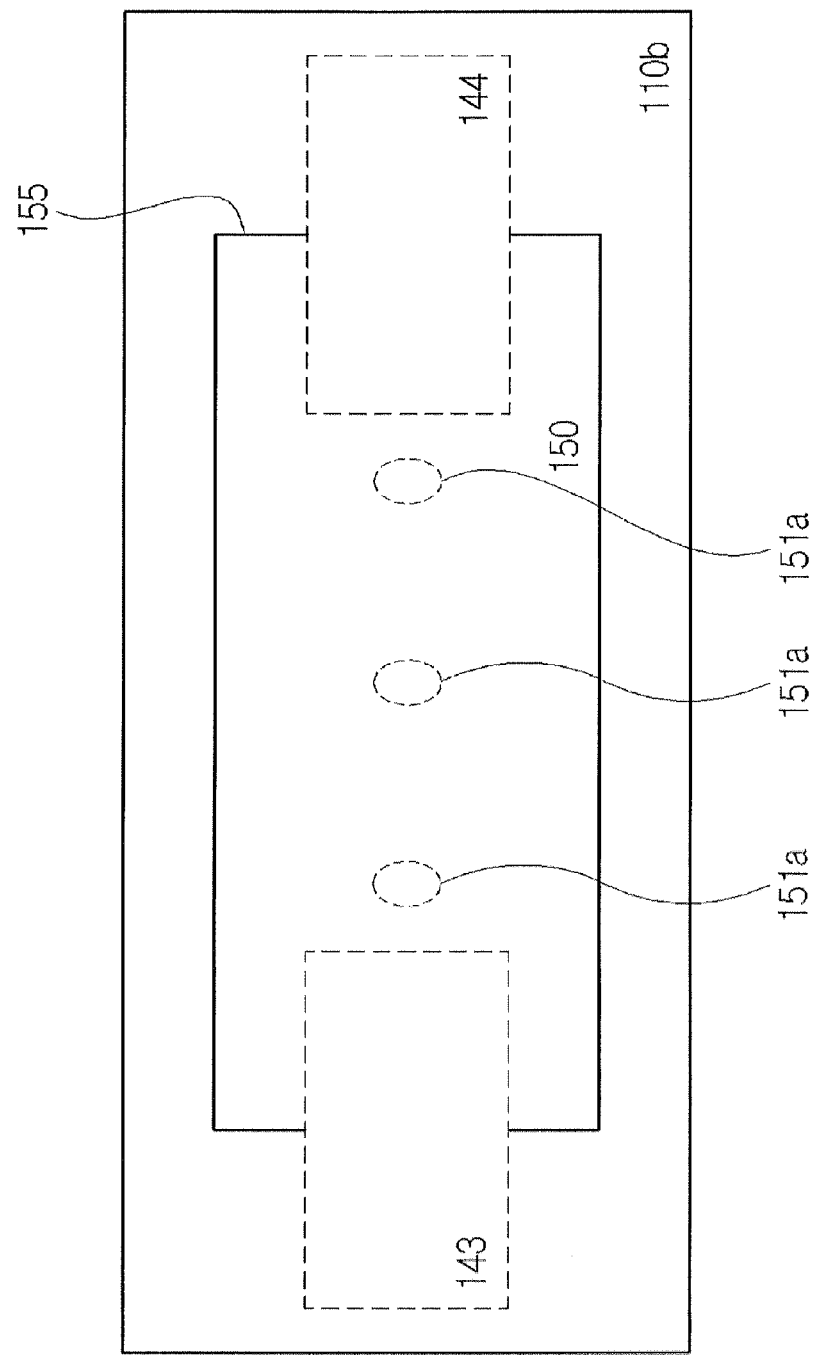
FIG. 11A is a sectional view illustrating a through hole pattern of a hard disk drive taken along line A-A' of FIG. 10.
Figure 11B:
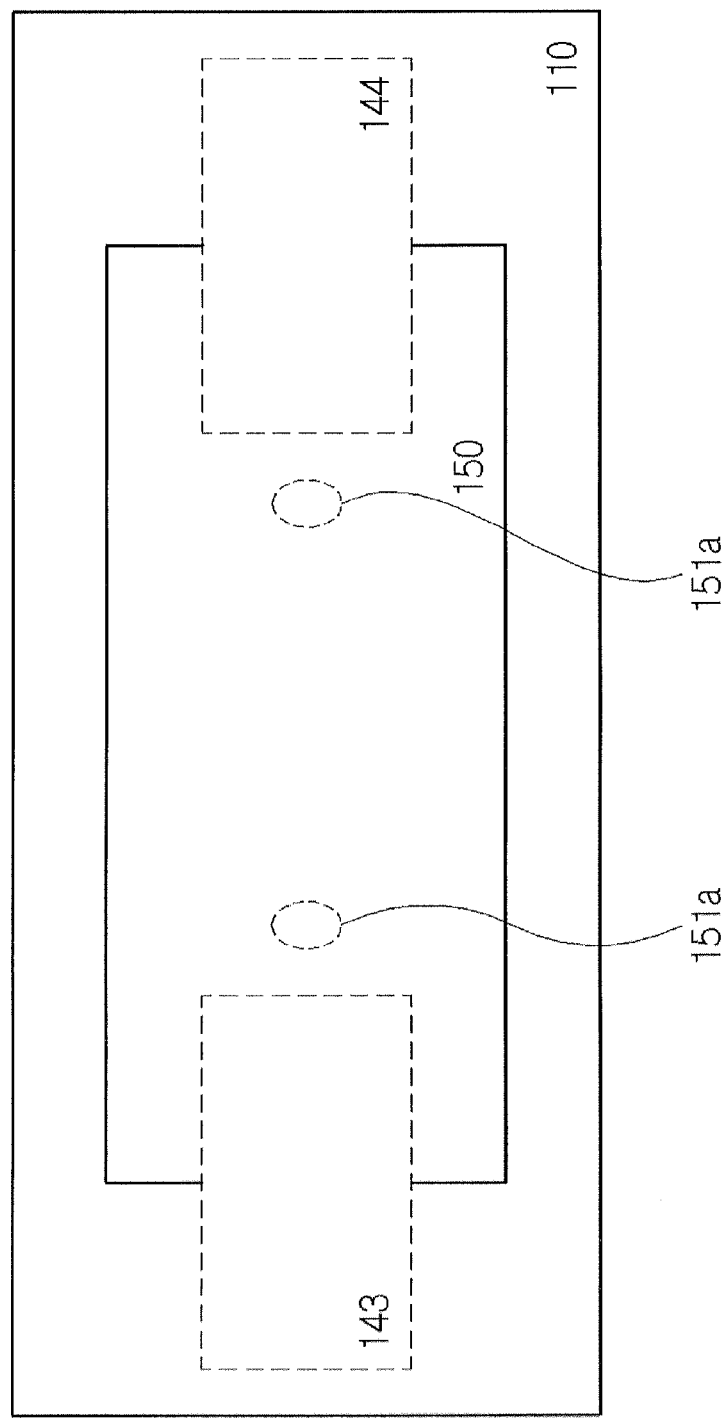
FIGS. 11B and 11C illustrate alternative desiccant through hole patterns according to embodiments of the present general inventive concept.
Figure 11C:
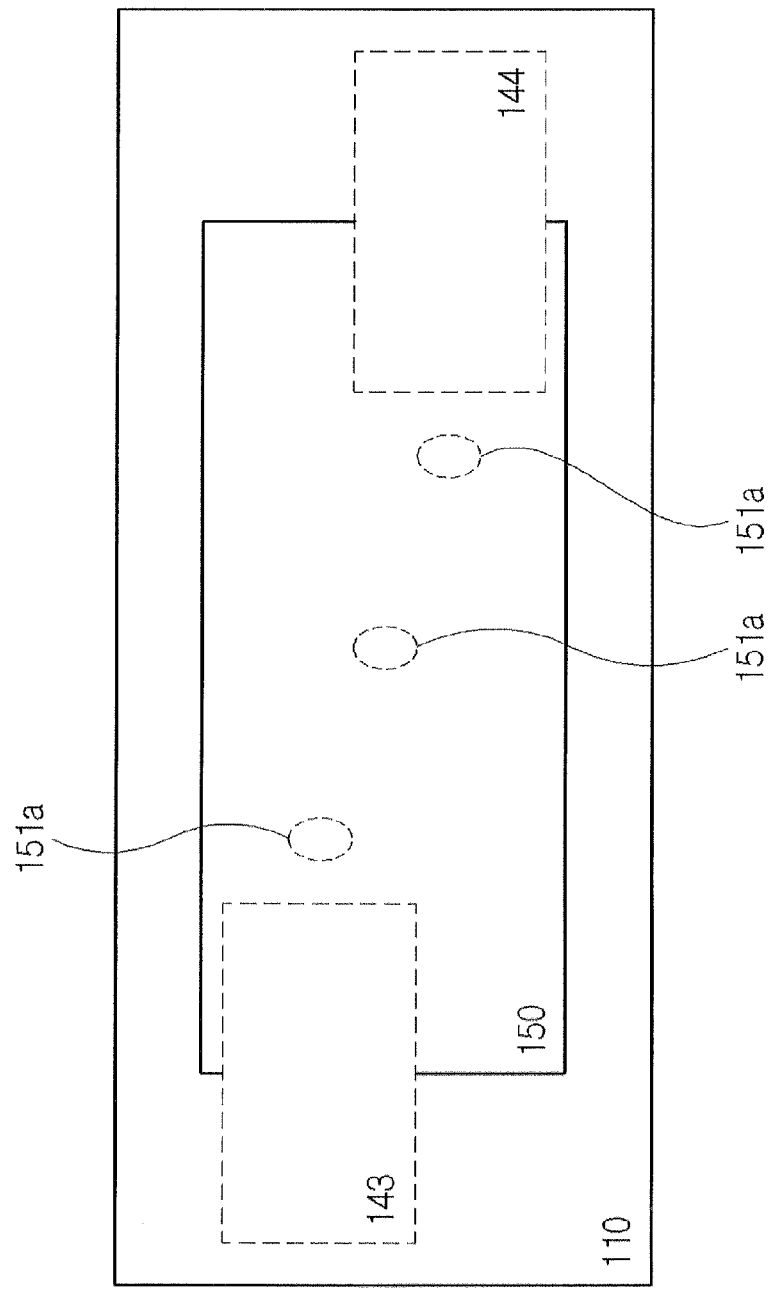

FIG. 11A is a sectional view illustrating a through hole pattern of a hard disk drive taken along line A-A' of FIG. 10. FIGS. 11B and 11C illustrate alternative desiccant through hole patterns according to embodiments of the present general inventive concept.

As illustrated in FIG. 11A, the base 110b may include a desiccant member 150 disposed within the desiccant member seating part 155. Positioned beneath the desiccant member 150 and the base 110b may be the plurality of desiccant through holes 151a, controller 143 and memory region 144 that function as heat sources. As illustrated in FIG. 11A, the desiccant through holes may lay along a straight, or horizontal line with the heat sources 143 and 144. Two of the through holes 151a may be disposed adjacent to the heat sources 143, 144 and a third may be positioned therebetween.

Alternatively, as illustrated in FIG. 11B, the desiccant member 150 may be positioned to overlay two desiccant through holes 151a positioned adjacent the heat sources 143 and 144. The present general inventive concept is not limited to the horizontal layouts illustrated in FIGS. 11A and 11B. If the heat sources 143, 144 are disposed in a vertical arrangement, rather than the horizontal arrangement illustrated in FIG. 11A, the desiccant through holes may also be arranged in a vertical configuration to be adjacent the heat sources to provide efficient ventilation and output for the humidity and moisture absorbed by the desiccant member 150.

In another example embodiment illustrated in FIG. 11C, if the heat sources 143 and 144 are not positioned along the same vertical or horizontal line, but are positioned at a diagonal to one another, a plurality of desiccant through holes 151a may be likewise positioned adjacent and between the diagonally or else wise positioned heat source members 143, 144 to provide ventilation and output for the humidity and moisture absorbed by the desiccant member 150.

Figure 12:
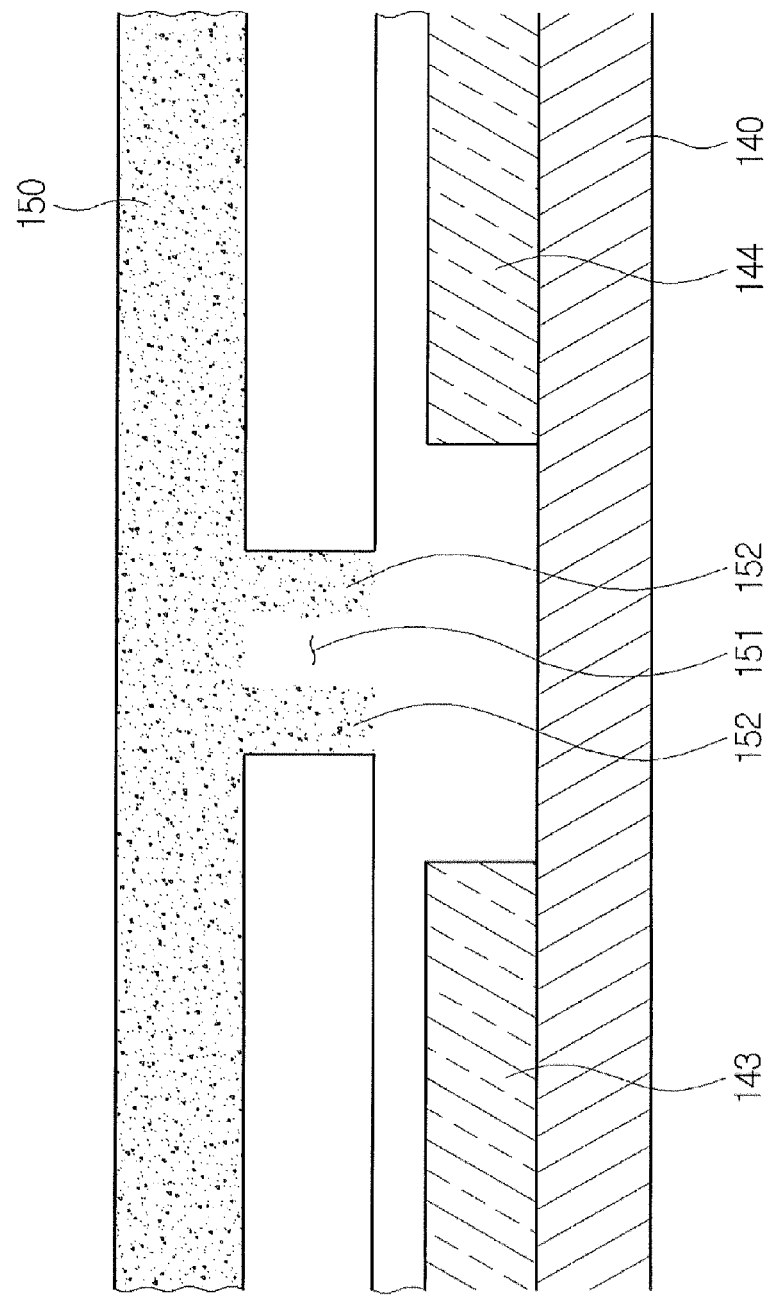
FIG. 12 is a partial schematic cross-section view illustrating another example embodiment of the present general inventive concept.

FIG. 12 is a partial schematic cross-section view illustrating another example embodiment of the present general inventive concept.

As illustrated in FIG. 12, a through hole 151 positioned beneath the desiccant member 150 of the present general inventive concept may be provided with a desiccant liner 152 disposed as a liner to line the one or a plurality of through holes 151 describer herein. The through hole desiccant liner 152 may provide a buffer zone between the desiccant member 150 and the heat sources 143 and 144. By first heating the desiccant liner 152 within the through hole 151, heat from sources 143 and 144 may be more readily transferred through the liner 152 and spread to the desiccant member 150 disposed above the through holes 151. Such a configuration may allow heat to spread more rapidly and efficiently to greater areas of the desiccant member 150 and allow the lower portion of the desiccant member 150 to remain dry. Thus, the temperature grade of the desiccant member may be maintained while humidity and moisture are constantly removed from the inner space 105.

As described above, there is provided a hard disk drive which can effectively remove internal humidity and thus improve reliance and performance in high humidity.

While the general inventive concept has been particularly illustrated and described with reference to exemplary embodiments thereof, it will be understood that various changes in form and details may be made therein without departing from the spirit and scope of the following claims.

Although a few embodiments of the present invention have been illustrated and described, it would be appreciated by those skilled in the art that changes may be made in these embodiments without departing from the principles and spirit of the general inventive concept, the scope of which is defined in the claims and their equivalents.

What is claimed is:

1. An apparatus comprising:
   a base internally provided with a plurality of internal parts related to reading and writing information;
   a printed circuit board assembly (PCBA) mounted with a plurality of parts on a surface thereof and coupled to one side of the base;
   a desiccant through hole penetrating the base along a thickness direction of the base and disposed above a heat generating source on the PCBA in the thickness direction that generates heat when operating among the plurality of parts mounted to the PCBA; and
   a desiccant member provided on the base above the desiccant through hole in the thickness direction and absorbing and discharging internal humidity of the base to an outside via the desiccant through hole.

2. The apparatus according to claim 1, wherein the heat generating source comprises at least one controller chip mounted to the surface of the PCBA and performing control related to reading and writing the information.

3. The apparatus according to claim 2, wherein the heat generating source comprises at least one memory chip mounted to the surface of the PCBA and storing data and a table.

4. The apparatus according to claim 3, wherein
the PCBA is coupled to a rear side of the base; and
the desiccant through hole is disposed between the controller chip and the memory chip.

5. The apparatus according to claim 4, further comprises a desiccant member seating part on a bottom portion of the base, where the desiccant member is at least partially accommodated and coupled.

6. The apparatus according to claim 4, further comprising a fitting projection which protrudes from a bottom surface inside the base and to which the desiccant member is fitted.

7. The apparatus according to claim 6, wherein the fitting projection comprises a straight type or a hook type an end of which is bent.

8. The apparatus according to claim 3, wherein
the PCBA is coupled to a rear surface of the base and the heat generating source is mounted to a rear surface of the PCBA, and
the PCBA further comprises a hole that communicates with the desiccant through hole.

9. The apparatus according to claim 1, wherein the desiccant through hole is plurally provided to correspond to one of the desiccant member.

10. The apparatus according to claim 1, wherein at least one set of the desiccant through hole and the desiccant member is provided in every region of a heat generating source on the PCBA.

11. The apparatus according to claim 1, wherein the desiccant member contacts the desiccant through hole.

12. The apparatus according to claim 1, wherein the desiccant member is coupled to the base by an adhesive resin.

13. The apparatus according to claim 1, further comprising a first region disposed between the PCBA and the base member having a high temperature and a second region disposed above the base member having a lower temperature than the temperature of the first region.

14. An apparatus comprising:
a printed circuit board assembly (PCBA) having a plurality of active and passive components including at least one controller and at least one memory device thereon;
a base member including a plurality of disks and a head stack assembly connected to the PCBA by a flexible printed circuit board;
a cover coupled to a top of the base to form an internal space within the base member;
a gasket interposed between the cover and the base to keep airtightness between the cover and the base;
a desiccant member formed in a bottom portion of the base member above the PCBA to absorb humidity within the internal space; and
at least one through hole positioned below the desiccant member to output humidity absorbed by the desiccant member.

15. The apparatus according to claim 14, wherein the humidity is output external to the hard drive.

16. The apparatus according to claim 15, wherein the heat from the controller or memory device prevents the desiccant member from being fully saturated.

17. The apparatus according to claim 14, wherein at least one of the controller and memory device heats the desiccant member through the through hole to create a temperature grade within the desiccant member.

18. The apparatus according to claim 14, further comprising a plurality of through holes positioned adjacent each of the controller and memory device.

19. The apparatus according to claim 14, further comprising a desiccant liner disposed within the at least one through hole.

* * * * *